(12) United States Patent
Moore et al.

(10) Patent No.: US 8,874,365 B2
(45) Date of Patent: Oct. 28, 2014

(54) SYSTEM FOR AND METHOD FOR PROVIDING A COMMUNICATION SYSTEM

(75) Inventors: Devin Moore, Lewis Center, OH (US); Wade Thompson, Moore, SC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 549 days.

(21) Appl. No.: 12/840,821

(22) Filed: Jul. 21, 2010

(65) Prior Publication Data

US 2012/0022741 A1   Jan. 26, 2012

(51) Int. Cl.
  *G01C 21/00*   (2006.01)
  *H04W 8/24*   (2009.01)
  *H04W 76/02*   (2009.01)
  *H04W 48/16*   (2009.01)

(52) U.S. Cl.
  CPC ............... *H04W 8/24* (2013.01); *H04W 76/02* (2013.01); *H04W 48/16* (2013.01)
  USPC ............ 701/412; 701/400; 340/902; 340/903

(58) Field of Classification Search
  None
  See application file for complete search history.

(56) References Cited

U.S. PATENT DOCUMENTS

| | | | |
|---|---|---|---|
| 6,958,707 B1 * | 10/2005 | Siegel | 340/902 |
| 8,422,481 B2 * | 4/2013 | Hanuni et al. | 370/348 |
| 2001/0029425 A1 * | 10/2001 | Myr | 701/200 |
| 2002/0121989 A1 * | 9/2002 | Burns | 340/901 |
| 2004/0128387 A1 * | 7/2004 | Chin et al. | 709/227 |
| 2005/0088318 A1 * | 4/2005 | Liu et al. | 340/902 |
| 2006/0176847 A1 * | 8/2006 | Chen et al. | 370/328 |
| 2007/0109111 A1 * | 5/2007 | Breed et al. | 340/435 |
| 2009/0210152 A1 * | 8/2009 | Kawa | 701/208 |
| 2010/0052945 A1 * | 3/2010 | Breed | 340/903 |
| 2010/0093383 A1 * | 4/2010 | Kim | 455/500 |
| 2010/0169009 A1 * | 7/2010 | Breed et al. | 701/208 |
| 2010/0289659 A1 * | 11/2010 | Verbil | 340/670 |
| 2010/0323661 A1 * | 12/2010 | Himmelstein | 455/404.2 |
| 2011/0010446 A1 * | 1/2011 | Chen et al. | 709/224 |
| 2011/0107084 A1 * | 5/2011 | Hubner et al. | 713/153 |
| 2012/0083995 A1 * | 4/2012 | Vorona | 701/119 |

* cited by examiner

*Primary Examiner* — James Trammell
*Assistant Examiner* — Demetra Smith-Stewart (57) ABSTRACT

A system for and method of establishing a communication link between mobile vehicles is presented. The method may include acquiring first information associated with a first mobile vehicle. The method may also include determining whether to update the first information associated with the first mobile vehicle. The method may further include transmitting, via a transceiver module, the first information associated with the first mobile vehicle based at least in part on the determination of not to update the first information associated with the first mobile vehicle.

24 Claims, 6 Drawing Sheets

SYSTEM FOR AND METHOD FOR PROVIDING A COMMUNICATION SYSTEM

BACKGROUND INFORMATION

Wireless networks have become increasingly popular for providing network access to a mobile user device to transmit messages. Wireless networks allow connectivity of mobile user devices to networked resources while reducing the need for traditional hard-wired network access. As a result, wireless networks provide a user with flexibility and convenience. For example, wireless networks allow for the mobility of a mobile user device within the coverage range of the wireless networks. However, wireless networks may be unavailable due to limited coverage range or network capacity, severe weather, or power outage. Also, wireless networks may be limited by coverage range and/or capacity to handle a number of mobile user devices. It may be difficult for mobile user devices to maintain a network connection because the mobile user device may be moving at a fast speed and/or in and out of the network coverage. Messages (e.g., 911 emergency messages or messages to loved ones) transmitted by the mobile user device when the wireless networks are unavailable may not be delivered.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

An exemplary embodiment provides a system and a process for establishing a communication link between mobile vehicles via the transmission control protocol (TCP) or the Internet protocol (IP) transmission. For example, a communication system may be coupled to, integrated, or otherwise associated with a mobile vehicle (e.g., a motorized vehicle). The communication system may determine primary information and secondary information associated with the mobile vehicle. In an exemplary embodiment, the primary information may include identification, velocity, direction, and/or position associated with the mobile vehicle. In another exemplary embodiment, the secondary information may include telemetry information associated with the mobile vehicle which may include brake application, emergency vehicle, turn signals, driving reverse, parked, lights on, component malfunctions, and other information associated with the mobile vehicle. The communication system may periodically or continuously update the primary information and the secondary information associated with the mobile vehicle. The communication system may periodically or continuously broadcast the primary information associated with the mobile vehicle.

A communication link may be establish between a first communication system associated with a first mobile vehicle and a second communication system associated with a second mobile vehicle. In an exemplary embodiment, a first communication system associated with a first mobile vehicle may broadcast primary information associated with the first mobile vehicle to a second communication system associated with a second mobile vehicle. The second communication system associated with the second mobile vehicle may receive the primary information associated with the first mobile vehicle and process the primary information associated with the first mobile vehicle. For example, the second communication system may process the primary information associated with the first mobile vehicle to determine whether to establish a communication link with the first communication system associated with the first mobile vehicle. When a communication link is established between the first communication system and the second communication system, secondary information associated with the first mobile vehicle and the second mobile vehicle may be exchanged. The communication link may terminate when the first communication system associated with the first mobile vehicle moves outside a transmission range of a second communication system associated with the second mobile vehicle, and vice versa.

A plurality of communication systems may form a mesh network. Advantageously, a first communication system may establish a communication link with a second communication system via one or more intermediate communication systems. In an exemplary embodiment, a first communication system may establish a first communication link with a first intermediate communication system. Subsequently, the first intermediate communication system may establish a second communication link with a second communication system. In other exemplary embodiments, a first communication system may establish and/or maintain one or more disparate communication links to a second communication system via a plurality of intermediate communication systems. For example, a first communication system may establish a communication link with a second communication system via a first intermediate communication system or a second intermediate communication system.

The communication system may couple the mobile vehicle to a service provider via a network, such as a wireless network, a wired network, and a combination of wireless and wired network. The communication system may broadcast primary information associated with the mobile vehicle to the service provider. Also, the communication system may broadcast secondary information associated with the mobile vehicle to the service provider. The service provider may establish a communication link with the mobile vehicle based at least in part on the primary information associated with the mobile vehicle. In an exemplary embodiment, the service provider may establish a communication link with the mobile vehicle based at least in part on a direction of travel of the mobile vehicle. For example, the service provider may establish a communication link with a mobile vehicle traveling towards the service provider or terminate a communication link with a mobile vehicle traveling away from the service provider.

Figure 1:
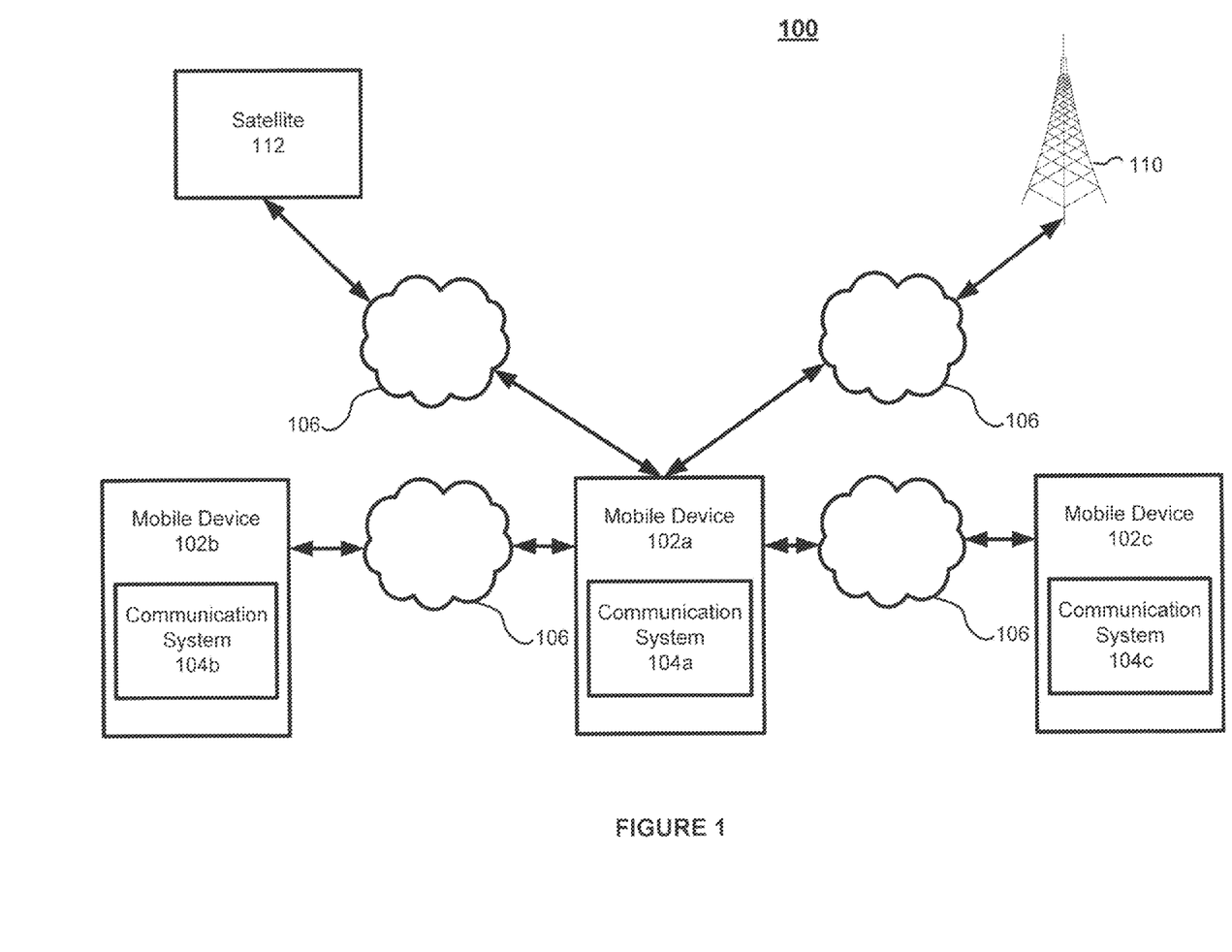
FIG. 1 is a schematic diagram illustrating a system according to a particular embodiment.

FIG. 1 is a schematic diagram illustrating a system according to particular embodiments. As illustrated in FIG. 1, system 100 may include a plurality of mobile vehicles 102(a-z) comprising a communication system 104(a-z). The plurality of communication system 104(a-z) may be coupled to, integrated with, or associated with each of the plurality of mobile vehicles 102(a-z). The plurality of mobile vehicle 102(a-z) may be coupled to each other via a communication network 106. The mobile vehicle 102 may be coupled to a transmitter/receiver system 110 or a satellite system 112 associated with a service provider via the communication network 106. In an exemplary embodiment, a first communication system 104a may obtain primary information and secondary information associated with the first mobile vehicle 102a. The first communication system 104a may periodically or continuously broadcast primary information associated with the first mobile vehicle 102a to the transmitter/receiver system 110 or the satellite system 112 associated with a service provider. Also, the first communication system 104a may periodically or continuously broadcast primary information associated with the first mobile vehicle 102a to other mobile vehicles 102. For example, the first communication system 104a may broadcast primary information associated with the first mobile vehicle 102a to a second communication system 104b associated with a second mobile vehicle 102b. A communication link may be established between the first communication system 104a and the second communication system 104b based at least in part on the primary information associated with the first mobile vehicle 102a and the primary information associated with the second mobile vehicle 102b. The first communication system 104a may transmit secondary information associated with the first mobile vehicle 102a to the second communication system 104b of the second mobile vehicle 102b via the established communication link.

The mobile vehicles 102(a-z) may establish a communication link with the transmitter/receiver system 110 or the satellite system 112 associated with a service provider. For example, the communication system 104 may broadcast information associated with the mobile vehicle 102 to the transmitter/receiver system 110 or the satellite system 112. The transmitter/receiver system 110 or the satellite system 112 may determine whether to establish a communication link with the mobile vehicle 102 based at least in part on the information associated the mobile vehicle 102. For example, the transmitter/receiver system 110 or the satellite system 112 may determine to transfer the mobile vehicle 102 between cellular coverage areas based at least in part on information associated with the mobile vehicle 102. In another exemplary embodiment, the transmitter/receiver system 110 or the satellite system 112 may prioritize transmission from the mobile vehicles 102(a-z) based at least in part on information associated with the mobile vehicles 102(a-z). For example, the transmitter/receiver system 110 or the satellite system 112 may establish a communication link with a mobile vehicle 102 traveling towards the transmitter/receiver system 110 or the satellite system 112 or terminate a communication link with a mobile vehicle 102 traveling away the transmitter/receiver system 110 or the satellite system 112.

The mobile vehicles 102(a-z) may be a transportation device, a motorized vehicle, a bicycle, a car, an ambulance, a fire engine, a bus, a truck, a van, a motorcycle, a train, a ship, an aircraft, a spacecraft, and other mobile vehicles. The mobile vehicles 102(a-z) may also include a petroleum powered vehicle, a nuclear powered vehicle, a wind powered vehicle, an electric powered vehicle, a solar powered vehicle, a jet powered vehicle, and other types of powered vehicles.

The communication network 106 may be a network that enables an Internet protocol (IP) transmission. The communication network 106 may be a wireless network, a wired network or any combination of wireless network and wired network. For example, the communication network 106 may include one or more of a fiber optics network, a passive optical network, a cable network, an Internet network, a satellite network (e.g., operating in Band C, Band Ku or Band Ka), a wireless LAN, a Global System for Mobile Communication (GSM), a Personal Communication Service (PCS), a Personal Area Network (PAN), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the communication network 106 may include, without limitation, telephone line, fiber optics, IEEE Ethernet 802.3, wide area network (WAN), local area network (LAN), or global network such as the Internet. The communication network 106 may support an Internet network, a wireless communication network, a cellular network, or the like, or any combination thereof.

The communication network 106 may utilize one or more protocols of one or more network elements to which it is communicatively coupled. The communication network 106 may translate to or from other protocols to one or more protocols of network devices. Although the communication network 106 is depicted as one network, it should be appreciated that according to one or more embodiments, the communication network 106 may comprise a plurality of interconnected networks, such as, for example, a service provider network, the Internet, a broadcaster's network, a cable television network, corporate networks, and home networks.

The transmitter/receiver system 110 may be a repeater, a microwave antenna, a cellular tower, or another network access device capable of providing connectivity between two different network mediums. Transmitter/receiver system 110 may be capable of sending and receiving signals via a mobile network, a paging network, a cellular network, a satellite network or a radio network. Transmitter/receiver system 110 may provide connectivity to one or more wired networks and may be capable of receiving signals on one medium such as a wired network and transmitting the received signals on a second medium such as a wireless network.

The satellite system 112 may include a single satellite or a plurality of satellites. For example, satellite system 112 may include astronomical satellites, biosatellites, communication satellites, miniaturized satellites, navigational satellites, reconnaissance satellites, earth observation satellites, space stations, tether satellites, weather satellites, anti-satellite weapons, or other types of satellites that may communicate with the communication system 104.

Figure 2:
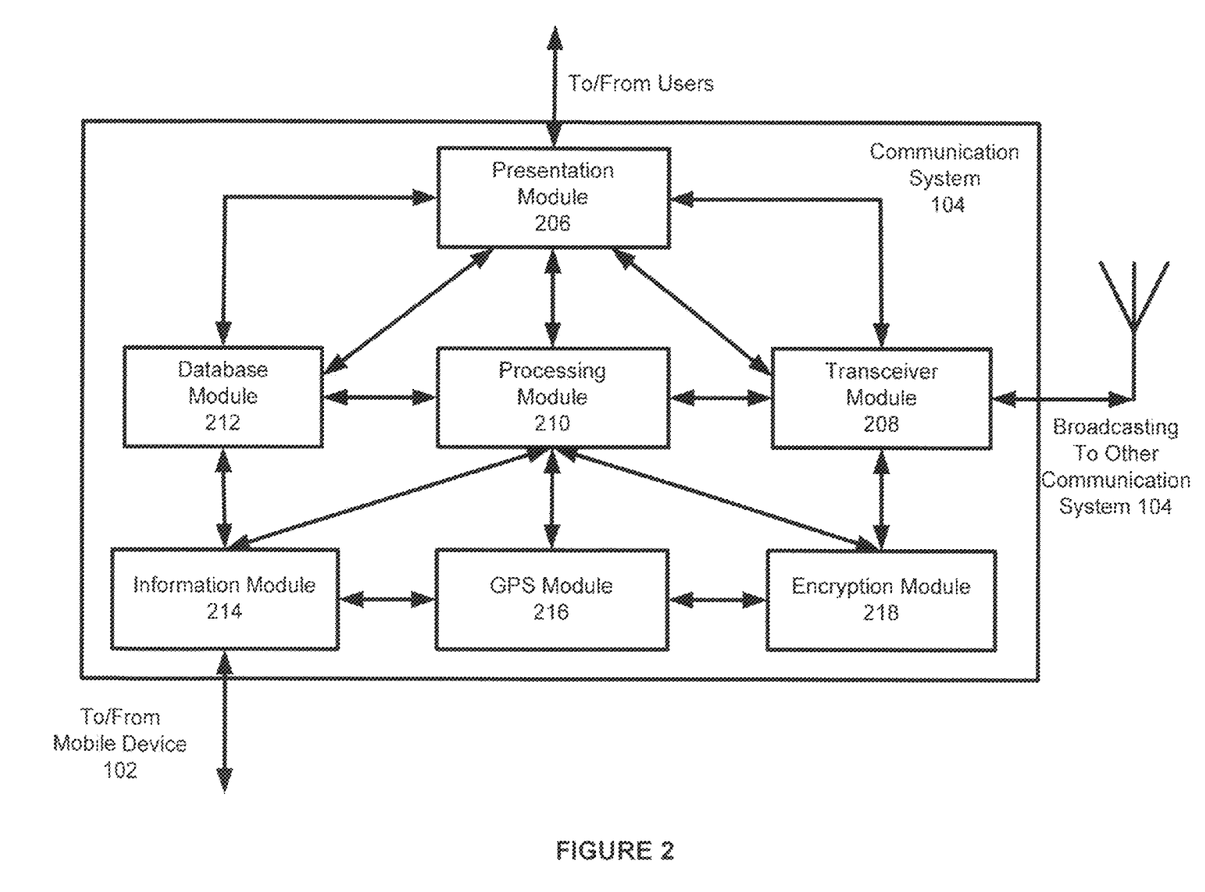
FIG. 2 is a block diagram of a hardware component of the communication system according to a particular embodiment.

FIG. 2 is a block diagram of a hardware component of a communication system according to a particular embodiment. The communication system 104 may include a presentation module 206, a transceiver module 208, a processing module 210, a database module 212, an information module 214, a global positioning system (GPS) module 216, or an encryption module 218. It is noted that the modules 206, 208, 210, 212, 214, 216, and 218 are exemplary and the functions performed by one or more of the modules may be combined with that performed by other modules. The functions described herein as being performed by the modules 206, 208, 210, 212, 214, 216, and 218 also may be separated and may be located or performed by other modules. Moreover, the modules 206, 208, 210, 212, 214, 216, and 218 may be implemented at other devices of the system 100 (e.g., the transmitter/receiver system 110 or the satellite system 112).

The presentation module 206 may provide an interface between the communication system 104 and a user associated with the mobile vehicle 102. The presentation module 206 may include a user interface, e.g., a graphical user interface, an application programming interface (API) to interact with the users associated with the mobile vehicle 102. The presentation module 206 may also include a display that may present information to the users associated with the mobile vehicle 102. The presentation module 206 may receive one or more queries or requests from a user and to provide the received queries or requests to other modules of the communication system 104. The presentation module 206 may provide queries or requests to the processing module 210, wherein the queries or requests may determine an operation of the processing module 210. In response to receiving a query or request from a user, the presentation module 206 may provide the queries or requests (e.g., control signals, etc.) to the transceiver module 208, the processing module 210, the database module 212, the information module 214, the GPS module 216, and the encryption module 218. In an exemplary embodiment, the user may request that the communication system 104 to transmit one or more messages to another communication system 104 associated with another mobile vehicle 102 via an established communication link.

In another exemplary embodiment, the presentation module 206 may present information or data to the user via a display. The presentation module 206 may display information or data upon a user's request, or the presentation module 206 may automatically display information or data to the user. In an exemplary embodiment, the presentation module 206 may provide information or data to indicate whether a first communication system 104a has established a communication link with a second communication system 104b. For example, the presentation module 206 may provide information or data to inform the user that a first communication system 104a has established a communication link with a second communication system 104b. In another exemplary embodiment, the presentation module 206 may provide information or data to indicate one or more operations performed by the communication system 104. For example, the presentation module 206 may provide a message (e.g., "CONNECTED") to inform the user that the first communication system 104a has established a communication link with a second communication system 104b. The presentation module 206 may display information or data provided by second communication system 104b to a user associated with a first communication system 104a. For example, the presentation module 206 may display the identification, speed, direction, position, brake information, lights information, or messages provided by a second communication system 104b. In other exemplary embodiments, the presentation module 206 may provide information or data to solicit a response from the user. For example, the presentation module 206 may solicit a response (e.g., any car accidents?) from the user to determine a driving route based on traffic conditions.

The presentation module 206 may include manual input (e.g., typing into a keyboard or keypad, etc.), voice input, touch screen input, graphical input (e.g., camera or camcorder) and/or any other method for inputting information or data. In an exemplary embodiment, the presentation module 206 may include manual inputs having one or more keyboards and/or key pad for inputting information. In an exemplary embodiment, a user associated with the first mobile vehicle 102a may input a message (e.g., text, graphical, or illustrative) via the presentation module 206 to be transmitted to a second communication system 104b associated with a second mobile vehicle 102b. The presentation module 206 may provide the message to the database module 212 to be stored. The user associated with the first mobile vehicle 102 may input a voice message or a video message via the presentation module 206 to be transmitted to a second communication system 104b associated with a second mobile vehicle 102b.

The transceiver module 208 may include an antenna, a transmitter, a receiver, or a combination of transmitter and receiver. The transceiver module 208 may receive broadcasting signals from other communication systems 104, the transmitter/receiver system 110 or the satellite system 112 to establish a communication link. Also, the transceiver module 208 may periodically or continuously broadcast signals to other communication systems 104 to establish a communication link. The transceiver module 208 may periodically or continuously broadcast signals to the transmitter/receiver system 110 or the satellite system 112 associated with a service provider. The transceiver module 208 may transmit additional signals to or receive additional signals from other communication systems 104, the transmitter/receiver system 110, or the satellite system 112, once a communication link is established. The transceiver module 208 may perform various preprocessing functions such as, amplifying, filtering, modulating/demodulating, mixing, tuning, and other functions may be needed to preprocess the signal. For example, the transceiver module 208 may preprocess (e.g., filter, sort, format, and aggregate) the signals received from other communication systems 104, the transmitter/receiver system 110, or the satellite system 112. In an exemplary embodiment, the preprocessing of the received signals performed by the transceiver module 208 may include filtering the signals and eliminating erroneous or defective signals, sorting the signals in accordance with the priority or chronological order, converting the signals into desired format (e.g., convert analog signals to digital signals, converting the signals into the transmission control protocol (TCP) or the Internet protocol (IP)). In another exemplary embodiment, the preprocessing of the signals to be transmitted by the transceiver module 208 may include formatting the signals for transmission (e.g., format the messages according to desired protocols for transmission).

The information module 214 may be a physical interface between the mobile vehicle 102 and the communication system 104. For example, the information module 214 may include a physical port (e.g., universal serial bus (USB) port), a physical connection (e.g., electrical connector), or other types of data connection between the mobile vehicle 102 and the communication system 104. The information module 214 may acquire information (e.g., primary information and secondary information) associated with the mobile vehicle 102. For example, the information module 214 may acquire primary information associated with the mobile vehicle 102. In an exemplary embodiment, the primary information associated with the mobile vehicle 102 may include identification, velocity, direction, position or other information associated with the mobile vehicle 102. The information module 214 may acquire secondary information associated with the mobile vehicle 102. In an exemplary embodiment, the secondary information associated with the mobile vehicle 102 may include telemetry information which may include brake application, emergency vehicle, turn signals, driving reverse, parked, lights on, component malfunctions, and other information associated with the mobile vehicle 102.

In an exemplary embodiment, the information module 214 may periodically acquire or update information associated with the mobile vehicle 102. In other exemplary embodiment, the information module 214 may continuously acquire or update information associated with the mobile vehicle 102. The information module 214 may be in communication with other modules of the communication system 104. For example, the information module 214 may provide the information associated with the mobile vehicle 102 to the database module 212 and stored. The information module 214 may also provide the information associated with the mobile vehicle 102 to the processing module 210 to be processed. The information module 214 may further provide the information associated with the mobile vehicle 102 to the presentation module 206 to be displayed to users associated with the mobile vehicle 102. The information module 214 may furthermore provide the information associated with the mobile vehicle 102 to the transceiver module 208 to be transmitted to other communication systems 104.

The processing module 210 may include one or more processors to control operations performed by the various modules of the communication system 104. The processing module 210 may be in communication with the presentation module 206, the transceiver module 208, the database module 212, the information module 214, the GPS module 216, and the encryption module 218. The processing module 210 may further include a plurality of sub-analytical processors to enable transmission and reception of signals. In an exemplary embodiment, the processing module 210 may process the signals received by the transceiver module 208 to establish a communication link. In another exemplary embodiment, the processing module 210 may process the information provided by the information module 214 and provide the processed information to the transceiver module 208 to be broadcasted to other communication system 104, the transmitter/receiver system 110, or the satellite system 112.

In an exemplary embodiment, the processing module 210 may process signals received by the transceiver module 208. The processing module 210 may process signals (e.g., packetized data via the transmission control protocol (TCP) or the Internet protocol (IP)) broadcast by other communication systems 104, the transmitter/receiver system 110 or the satellite system 112 and received by the transceiver module 208. The processing module 210 may process the received signal to obtain information associated with other mobile vehicles 102. In an exemplary embodiment, the processing module 210 may process the received signal to obtain primary information associated with other mobile vehicles 102. The processing module 210 may determine an identification, a velocity, a direction, a position or other information associated with other mobile vehicles 102 based at least in part on information received from the second communication system 104b.

In an exemplary embodiment, the processing module 210 may determine whether a communication link may be established between a first communication system 104a and the second communication system 104b based at least in part on information associated with the second communication system 104b. In another exemplary embodiment, the processing module 210 may determine whether a communication link may be established between a first communication system 104a and the second communication system 104b based at least in part on information associated with the first communication system 104a. For example, the processing module 210 may access the information module 214 or the database module 212 to obtain information associated with the first communication system 104a. The processing module 210 may receive information associated with the second communication system 104b from the transceiver module 208. The processing module 210 may compare the information associated with the first mobile vehicle 102a with the information associated with the second mobile vehicle 102a in order to determine whether a communication link may be established between the first communication system 104a and the second communication system 104b.

In an exemplary embodiment, the processing module 210 may compare the position of the first mobile vehicle 102a with the position of the second mobile vehicle 102b. For example, when the processing module 210 determines that the first mobile vehicle 102a and the second mobile vehicle 102a are within a transmission range of each other, the processing module 210 may determine to establish a communication link between the first communication system 104a and the second communication system 104b. In another exemplary embodiment, the processing module 210 may compare a direction of travel for the first mobile vehicle 102a with the direction of travel for the second mobile vehicle 102b. For example, when the processing module 210 determines that the first mobile vehicle 102a and the second mobile vehicle 102b are travelling in the same direction, the processing module 210 may determine to establish a communication link between the first communication system 104a and the second communication system 104b. In other exemplary embodiments, the processing module 210 may compare a velocity of the first mobile vehicle 102a with a velocity of the second mobile vehicle 102b. For example, the processing module 210 may determine that the velocity of the first mobile vehicle 102a and the velocity of the second mobile vehicle 102b are within a predetermined range (e.g., ±5 MPH), the processing module 210 may determine to establish a communication link between the first communication system 104a and the second communication system 104b.

In an exemplary embodiment, the processing module 210 may determine that a communication link is established between the first communication system 104a and the second communication system 104b, secondary information may be transmitted between the first communication system 104a and the second communication system 104b. For example, the processing module 210 may access the information module 214 or the database module 212 to acquire secondary information associated with the first communication system 104a. The secondary information associated with the first mobile vehicle 102a may be telemetry information which may include brake application, emergency vehicle, turn signals, driving reverse, parked, lights on, component malfunctions, and other information associated with the mobile vehicle 102. Also, when one or more messages may be transmitted, the processing module 210 may acquire and transmit the one or more messages via the transceiver module 208.

In another exemplary embodiment, the processing module 210 may determine that a communication link is established between the first communication system 104a and the second communication system 104b, the processing module 210 may process secondary information provided by the second communication system 104b. For example, the processing module 210 may process the secondary information provided by the second communication system 104b and display the secondary information provided by the second communication system 104b to users associated with the first communication system 104a. For example, the processing module 210 may process the secondary information provided by the second communication system 104b to alert users associated with the first communication system 104a that the second mobile vehicle 102b is slowing down. In another example, the processing module 210 may process the secondary information provided by the second communication system 104b to display messages provided by the second communication system 104b to users associated with the first communication system 104a.

The processing module 210 may generate and assign a max-hop counter to the information or messages transmitted by or received from the transceiver module 208. For example, the max-hop counter may be a part of the metadata associated with the information or messages transmitted. The max-hop counter may be decremented each time the information or messages are relayed to a communication system 104. The processing module 210 may assign a predetermine number to the max-hop counter to indicate a number of times the information or messages may be relayed. The information or messages may be relayed via one or more communication systems 104 until the max-hop counter reaches zero. In an exemplary embodiment, the processing module 210 may assign a number five to the max-hop counter and the max-hop counter may be transmitted as part of the metadata associated with the information or messages. The information or messages may be transmitted five times via the plurality of communication systems 104 until the max-hop counter reaches zero. In other exemplary embodiments, the information or message may be transmitted two, three, ten, fifteen, twenty, or thirty times via the plurality of communication systems 104 until the max-hop counter reaches zero. In another exemplary embodiment, the max-hop counter may be a factorial counter (e.g., factorial of a non-negative integer n or product of all positive integers less than or equal to n). For example, the processing module 210 may assign a number 3 to the max-hop counter and the max-hop counter may be transmitted as part of the metadata associated with the information or messages. The information or messages may be transmitted for 6 times (e.g., 1×2×3) via a plurality of communication systems 104 until the max-hop counter reaches zero.

The processing module 210 may assign a priority level to one or more messages (e.g., from highest to lowest "E", "1," "2," "3," "4," and "5"). The processing module 210 may also determine a priority level of one or more received messages. In an exemplary embodiment, the processing module 210 may assign a priority level to one or more messages based at least in part on a user or an identification associated with the mobile vehicle 102. A user associated with the mobile vehicle 102 may create a plurality of messages for transmission via the communication system 104. The user may assign a priority level associated with each of the plurality of messages, and the processing module 210 may assign a priority level to the messages according to the priority level assigned by the user to each of the plurality of messages. For example, a user may assign emergency response messages (e.g., ambulance, fire engine, police) with the highest priority level (e.g., "E" or an emergency indication), traffic alerts with a priority level (e.g., "2"), information associated with the mobile vehicle 102 with a priority level (e.g., "4"). The processing module 210 may also automatically assign a priority level (e.g., "E" or an emergency indication) for messages intended for emergency response, a priority level (e.g., "2") for messages intended for traffic alerts, and a priority level (e.g., "4") for messages intended for information associated with the mobile vehicle 102.

The processing module 210 may add or associate metadata or metainformation to the messages received by the transceiver module 208. For example, the metadata or metainformation may include, time stamps, location, velocity, direction, an emergency indication of the mobile vehicle 102, user identification and information, mobile vehicle identification information, max-hop counter, priority level, or other information or data associated with the messages. The metadata or metainformation may be transmitted along with the messages.

The processing module 210 may perform a data compression operation in order to reduce an amount of data for transmission and increase the transmission speed. For example, the processing module 210 may perform data compression operation using various algorithms including, lossless algorithms, Lempel-Ziv (LZ) compression algorithms, lossy data compression or perceptual coding, lossy image compression algorithms, lossy audio compression algorithms, other types of algorithms for compressed encoding information. The processing module 210 may also perform a data decompression operation upon reception of one or more messages.

The database module 212 may store information associated with the mobile vehicle 102 and manage one or more received messages. The database module 212 may provide an interface, e.g., a uniform interface, for other modules within the communication system 104 and may write, read, and search for information associated with mobile vehicle 102 and the messages stored in one or more repositories or databases. The database module 212 may also perform other functions, such as, but not limited to, concurrent access, backup and archive functions. Due to limited amount of storing space the database module 212 may compress, store, transfer or discard information associated with the mobile vehicle 102 and the messages stored within, after a period of time, e.g., a minute, an hour, a day. The database module 212 may store information associated with the mobile vehicle 102. The database module 212 may also provide information associated with the mobile vehicle 102 and one or more messages to the processing module 210 for transmission via the transceiver module 208. In another exemplary embodiment, the database module 212 may store information and messages from another mobile vehicle 102. For example, the transceiver module 208 may receive information and messages from another mobile vehicle 102. The transceiver module 208 may provide the information or messages from another user device 102 to the database module 212 and store the information or messages.

The database module 212 may be network accessible storage and may be local, remote, or a combination thereof to modules 206, 208, 210, 214, 216, and 218. The database module 212 may utilize a flash memory, a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage.

The GPS module 216 may include one or more processors to determine information associated with the mobile vehicle 102. For example, the GPS module 216 may determine the position, velocity, direction, or other information associated with the mobile vehicle 102. In an exemplary embodiment, the GPS module 216 may establish a communication link with the satellite system 112 to determine information associated with the mobile vehicle 102. The GPS module 216 may calculate the position, velocity, direction, and other information associated with the mobile vehicle 102 based on the communication link with the satellite system 112. The GPS module 216 may include one or more databases to store position, velocity, direction, and other information determined by the GPS module 216. The GPS module 216 may also provide the position, velocity, direction, and other information associated with the mobile vehicle 102 determined by the GPS module 216 to the presentation module 206, the transceiver module 208, the processing module 210, the database module 212, the information module 214, and the encryption module 218.

In another exemplary embodiment, the GPS module 216 may interface with the mobile vehicle 102 to determine information associated with the mobile vehicle 102. For example the GPS module 216 may monitor and acquire information associated with the mobile vehicle 102. For example, the GPS module 216 may monitor and acquire position information, velocity information, and direction information associated with the mobile vehicle 102.

The GPS module 216 may determine and/or store position, velocity, direction, and other information associated with the mobile vehicle 102. The GPS module 216 may map a geographical layout based at least in part on the position, velocity, direction, and other information associated with the mobile vehicle 102. For example, mapping information of the GPS module 216 may be imported and/or updated by commercially available mapping sources to visually locate the position information determined by the GPS module 216 on a geographical map. These mapping sources may include Google Maps™, GoogleEarth™, MapQuest™, Yahoo Maps™, and/or other electronic mapping sources. The geographical position determined by the GPS module 216 may be mapped and/or stored in the GPS module 216 and/or the database module 212. In addition to storing the information identified above, the GPS module 216 may also determine and/or record past position, velocity, direction, and other information determined by the GPS module 216 to provide an indication of the geographical regions.

The encryption module 218 may encrypt the information or messages from the transceiver module 208 or the processing module 210. For example, the encryption module 218 may encrypt the information or messages using public encryption key pairs, a private encryption key, Rijndael encryption, Serpent encryption, Twofish encryption, RC6 encryption, MARS encryption or other process or algorithms to encrypt the information or messages transmitted by the transceiver module 208.

Figure 3:
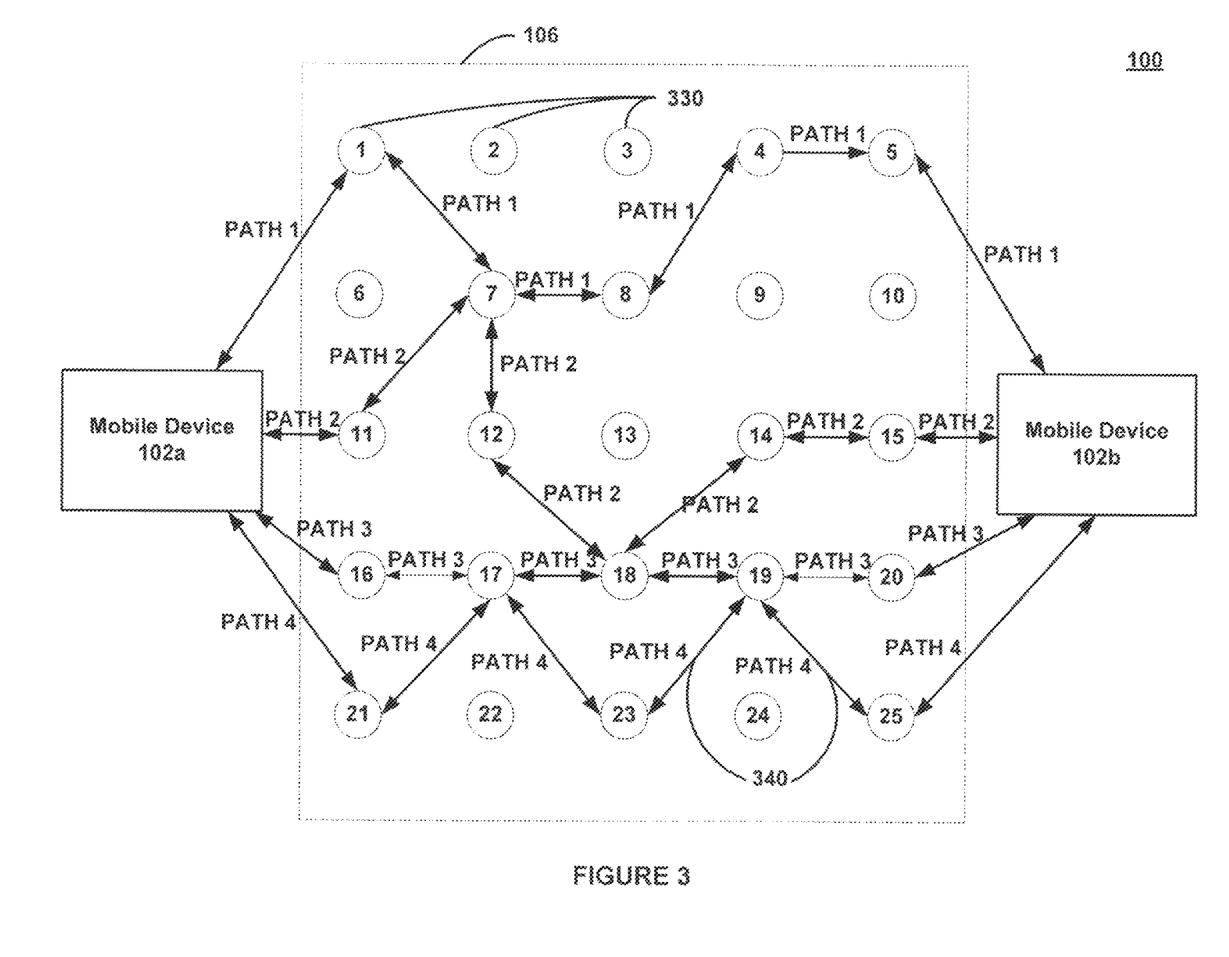
FIG. 3 illustrates a schematic diagram illustrating a system for establishing a communication link between mobile vehicles according to a particular embodiment.

FIG. 3 illustrates a schematic diagram illustrating a system for establishing a communication link between mobile vehicles according to a particular embodiment. As illustrated in FIG. 3, the mobile vehicle 102 may establish a communication link with another mobile vehicle 102. The mobile vehicle 102 may transmit messages to another mobile vehicle 102 via multiple paths. In an exemplary embodiment, a first mobile vehicle 102 may transmit an alert message (e.g., traffic alert or emergency alert) to another mobile vehicle 102 via multiple paths. The first communication system 104a associated with a first mobile vehicle 102a may process the messages before transmitting the messages to another receiving communication system 104(b-z) associated with another mobile vehicle 102(b-z). In an exemplary embodiment, the processing module 210 of the first communication system 104a may compress the messages in order to reduce an amount of data transmitted and increase the transmission speed.

In another exemplary embodiment, the processing module 210 may assign metadata (e.g., time stamp, priority level, max-hop counter) to the messages. For example, the processing module 210 may generate a max-hop counter associated with the messages to determine a max number of times the messages will be transmitted to other communication systems 104. For example, the processing module 210 may generate a max-hop counter having a predetermined counter of 7. The messages will be transmitted 7 times to 7 different communication systems 104 with the max-hop counter decremented with each transmission to different communication system 104. Once the max-hop counter associated with the message decremented to zero, the messages will not he transmitted to another communication system 104.

The first communication system 104a associated with a first mobile vehicle 102a may search for a second communication system 104b associated with a second mobile vehicle 102b to relay the messages. For example, the transceiver module 208 may transmit primary information to seek one or more proximate communication systems 104 and establish a communication link. In the event that one or more proximate communication systems 104 may establish a communication link with the first communication system 104a. The first communication system 104a may transmit the encrypted primary information and metadata to the one or more proximate communication systems 104(b-z). The one or more proximate communication systems 104(b-z) may process the received encrypted primary information and metadata to determine whether a communication link may be established with the first communication system 104a. In the event that the one or more proximate communication system 104(b-z) determines that a communication link may be established with the first communication system 104a, a communication link may be established between the first communication system 104a and the one or more proximate communication systems 104(b-z).

The first communication system 104a may transmit encrypted secondary information to the one or more proximate communication systems 104(b-z) when a communication link is established between the first communication system 104a and the one or more proximate communication systems 104(b-z). The one or more proximate communication systems 104(b-z) may process the encrypted secondary information messages and metadata and display the encrypted secondary information. In an exemplary embodiment, the proximate communication systems 104(b-z) may process the max-hop counter associated with the encrypted secondary information. For example, the proximate communication systems 104(b-z) may decrement the max-hop counter associated with the encrypted secondary information. In an exemplary embodiment, in the event that the max-hop counter is greater than 1, the proximate communication systems 104(b-z) may decrement the max-hop counter by 1 and transmit the encrypted secondary information and metadata to other communication systems 104 that may establish a communication link with the proximate communication systems 104(b-z). In the event that the max-hop counter is equal to 1, the proximate communication systems 104 may decrement the max-hop counter by 1 and stop transmitting the encrypted secondary information message and metadata to another communication system 104.

As illustrated in FIG. 3, a first mobile vehicle 102a may be communicatively coupled to a second mobile vehicle 102b via the communication network 106. The communication network 106 may include a number of nodes 330 to communicatively couple the first mobile vehicle 102a to the second mobile vehicle 102b. The first mobile vehicle 102a may be communicatively coupled to the second mobile vehicle 102b via a plurality of communication paths having various nodes 330. In an exemplary embodiment, the first mobile vehicle 102a may be communicatively coupled to the second mobile vehicle 102b via five communication paths (e.g., communication path 1, communication path 2, communication path 3, and communication path 4) via various different nodes 330. The nodes 330 may relay information or messages from the first mobile vehicle 102a to the second mobile vehicle 102b. The number of nodes 330 within the communication network 106 may vary based at least in part on the location, time, coverage range, battery power, and functionality associated with the communication system 104 hosted by the mobile vehicle 102. Also, the number of nodes 330 within the communication network 106 may vary based at least in part selection by one or more users associated with the nodes 330. For example, the one or more users associated with the nodes 330 may select to activate or inactivate the one or more nodes 330 (e.g., turn on or off the communication system 104) within the communication network 106. Further, the number of nodes 330 within the communication network 106 may vary based at least in part on the service provider (not shown). For example, the service provider (not shown) may activate or inactivate the one or more nodes 330 within the communication network 106.

The one or more nodes 330 may be an originating node where transmission of data commences, a termination node where transmission of data terminates, or an intermediate node where transmission of data may traverse. The nodes 330 may be a mobile vehicle 102 hosting a communication system 104 that may be communicatively coupled to other communication systems 104 hosted by other mobile vehicles 102 to communicatively couple the first mobile vehicle 102a and the second mobile vehicle 102b. In another exemplary embodiment, the nodes 330 may be the transmitter/receiver system 110 or the satellite system 112. In addition, the one or more nodes 330 may include a repeater, a digipeater, a signal carrier system, a broadcast translator, a cellular repeater, an Ethernet huh, a multi-port repeater, a microwave radio relay, an L-carrier, an optical communication repeater, a radio repeater and/or other devices that are capable of receiving signals and retransmit signals.

Communication links 340 may be a communication channel that may couple two or more nodes 330. The communication links 340 may be one or more wired communication links or one or more wireless communication links: Communication link 340 may be a point-to-point link, a multi-point link, a point-to multi-point link, or a combination of different types of communication links. In an exemplary embodiment, the communication links 340 may transmit packets of data via the transmission control protocol (TCP) or the Internet protocol (IP). For example, the one or more wired communication links 340 may include optical fiber, multi-mode optical fibers, single-mode optical fibers, graded-index fibers, step-index optical fiber or a combination of the different types of optical fiber mentioned before. Further, the one or more wired communication links 340 may include telephone line, co-axial cable and/or other wired communication link for transmission of data. The one or more wireless communication links 340 may include cellular links, wireless LAN links, Global System for Mobile Communication (GSM) links, Personal Communication Service (PCS) links, Personal Area Network (PAN) links, D-AMPS links, Wi-Fi links, Fixed Wireless Data links, satellite links, IEEE 802.11a links, 802.11b links, 802.15.1 links, 802.11n and 802.11g links and/or other wireless link to enable transmission of data.

Figure 4:
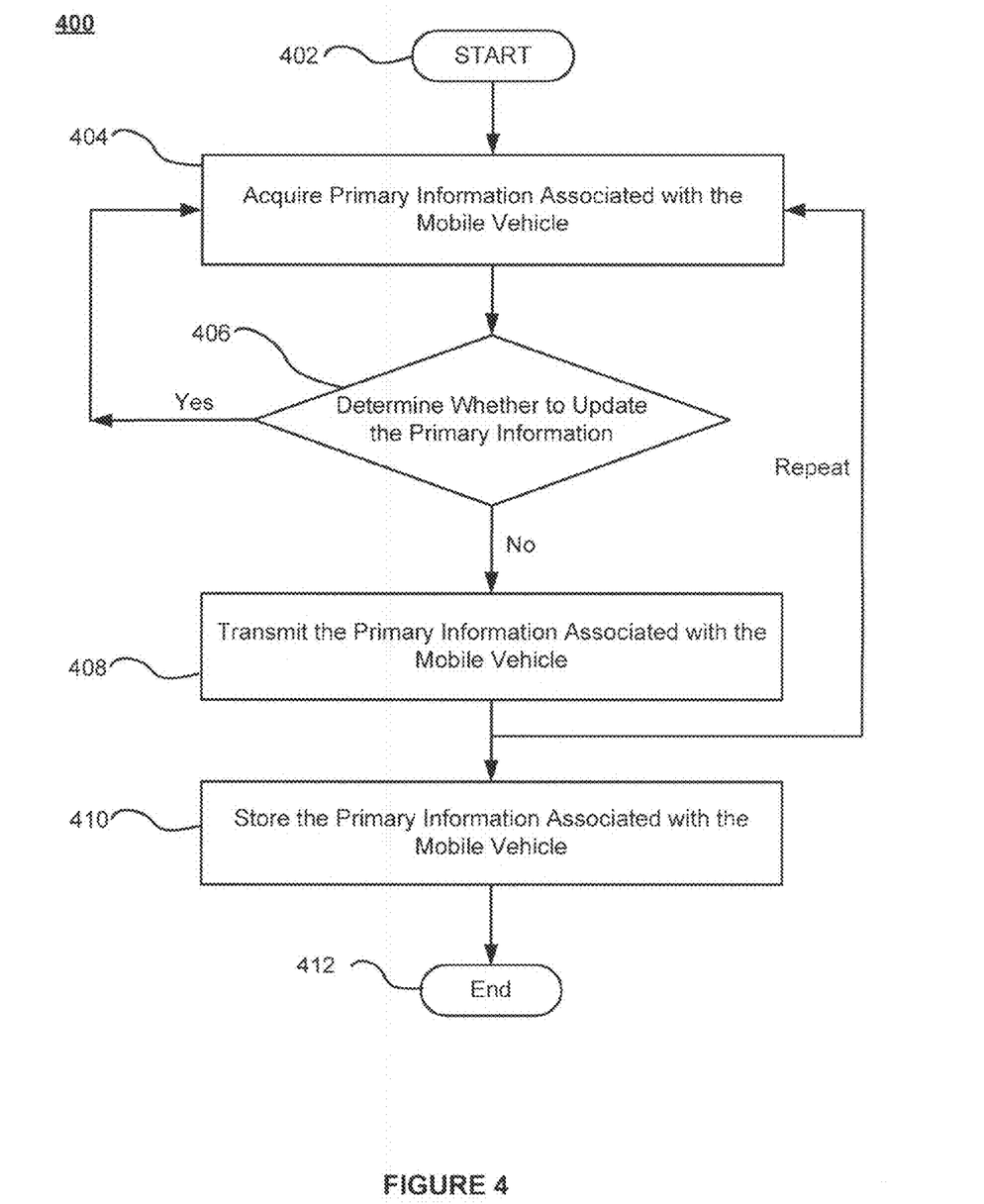
FIG. 4 is a flowchart illustrating the functionality for establishing a communication link between mobile vehicles according to a particular embodiment.

FIG. 4 is a flowchart illustrating the functionality for establishing a communication link between mobile vehicles according to a particular embodiment. This exemplary method 400 may be provided by way of example, as there are a variety of ways to carry out the method. The method 400 shown in FIG. 4 can be executed or otherwise performed by one or a combination of various systems. The method 400 is described below may be carried out by the systems and networks shown in FIGS. 1 and 2, by way of example, and various elements of the systems and networks are referenced in explaining the example method of FIG. 4. Each block shown in FIG. 4 represents one or more processes, methods or subroutines carried out in exemplary method 400. Referring to FIG. 4, exemplary method 400 may begin at block 402.

At block 402, the method 400 for establishing a communication link between mobile vehicles 102 may begin.

At block 404, a communication system 104 may acquire primary information associated with the mobile vehicle 102. For example, the processing module 210 may provide executable commands to other modules of the communication system 104 to acquire primary information associated with the mobile vehicle 102. In an exemplary embodiment, the processing module 210 may provide an acquire information command to the information module 214 to acquire primary information associated with the mobile vehicle 102. In another exemplary embodiment, the processing module 210 may provide an acquire information command to the GPS module 216 to acquire primary information associated with the mobile vehicle 102. For example, the primary information associated with the mobile vehicle 102 may include position, velocity, direction, identification, and other information of the mobile vehicle 102. In an alternative exemplary embodiment, the information module 214 or the GPS module 216 may automatically acquire primary information associated with the mobile vehicle 102. The information module 214 or the GPS module 216 may provide the primary information associated with the mobile vehicle 102 to the processing module 210 or the database module 212. After acquiring primary information associated with the mobile vehicle 102, the method 400 may proceed to block 406.

At block 406, the communication system 104 may determine whether to update the primary information associated with the mobile vehicle 102. For example, the processing module 210 may process the primary information associated with the mobile vehicle 102 to determine whether to update the primary information associated with the mobile vehicle 102. In an exemplary embodiment, the processing module 210 may determine a time stamp of the acquisition of the primary information associated with the mobile vehicle 102. The processing module 210 may determine to update the primary information associated with the mobile vehicle 102 when a predetermined amount of time has lapsed from the time of the acquisition of the primary information associated with the mobile vehicle 102. The processing module 210 may determine not to update the primary information associated with the mobile vehicle 102 when the time lapsed from the time of the acquisition of the primary information associated with the mobile vehicle 102 is less than a predetermined amount of time. For example, the processing module 210 may determine that the predetermined amount of time to be 3 seconds.

In another exemplary embodiment, the processing module 210 may access the database module 212, the information module 214, or the GPS module 216 to determine whether updated primary information are available. For example, the processing module 210 may periodically access the database module 212, the information module 214, or the GPS module 216 to check whether updated primary information are acquired. In other exemplary embodiments, the processing module 210 may instruct the information module 214 to acquire primary information associated with the mobile vehicle 102. The processing module 210 may compare the newly acquired primary information with previously acquired primary information to determine whether to update the primary information associated with the mobile vehicle 102. In the event that the processing module 210 determines that the primary information have to be updated, the method 400 may return to block 404 to acquire primary information associated with the mobile vehicle 102. In the event that the processing module 210 determines that the primary information do not have to be updated, the method 400 may proceed to block 408.

At block 408, the communication system 104 may transmit the primary information associated with the mobile vehicle 102. In an exemplary embodiment, the processing module 210 may provide the primary information associated with the mobile vehicle 102 to the transceiver module 208 to be transmitted via the transmission control protocol (TCP) or the Internet protocol (IP). In another exemplary embodiment, the information module 214 may directly provide the primary information associated with the mobile vehicle 102 to the transceiver module 208 to be transmitted. In other exemplary embodiment, the primary information associated with the mobile vehicle 102 may be encrypted by the encryption module 218 before being transmitted by the transceiver module 208. The presentation module 206 may provide confirmation to the user of the mobile vehicle 102 that the primary information associated with the mobile vehicle 102 may be transmitted.

The processing module 210 may assign a priority level to the primary information (e.g., from highest to lowest "E", "1," "2," "3," "4," and "5"). In an exemplary embodiment, the processing module 210 may assign a priority level to the primary information based at least in part on an identification of the mobile vehicle 102. For example, the mobile vehicle 102 may be an emergency response vehicle (e.g., ambulance, fire engine, or police), the processing module 210 may assign the primary information associated with the mobile vehicle 102 with the highest priority level (e.g., "E" or an emergency indication). The processing module 210 may add or associate the priority level to the primary information associated with the mobile vehicle 102 as metadata or metainformation to the primary information associated with the mobile vehicle 102. For example, the metadata or metainformation may include, time stamps, location, velocity, direction, and other information of the mobile vehicle 102, user identification and information, mobile vehicle identification information, max-hop counter, priority level, or other information or data associated with the messages. In an exemplary embodiment, after transmitting the primary information associated with the mobile vehicle 102, the method 400 may return to block 404 and repeat the method of establishing a communication link between mobile vehicles 102(a-z) and return to block 404. In another exemplary embodiment, after transmitting the primary information associated with the mobile vehicle 102, the method 400 may proceed to block 410.

At block 410, the communication system 104 may store the primary information associated with the mobile vehicle 102. In an exemplary embodiment, the primary information associated with the mobile vehicle 102 may be stored in the database module 212. For example, the primary information associated with the mobile vehicle 102 may be stored in the database module 212 after transmission of the primary information associated with the mobile vehicle 102. In another exemplary embodiment, the primary information associated with the mobile vehicle 102 may be stored in the mobile vehicle 102 for a predetermined period of time. After storing the primary information associated with the mobile vehicle 102, the method may proceed to block 412.

At block 412, the method 400 may end.

Figure 5:
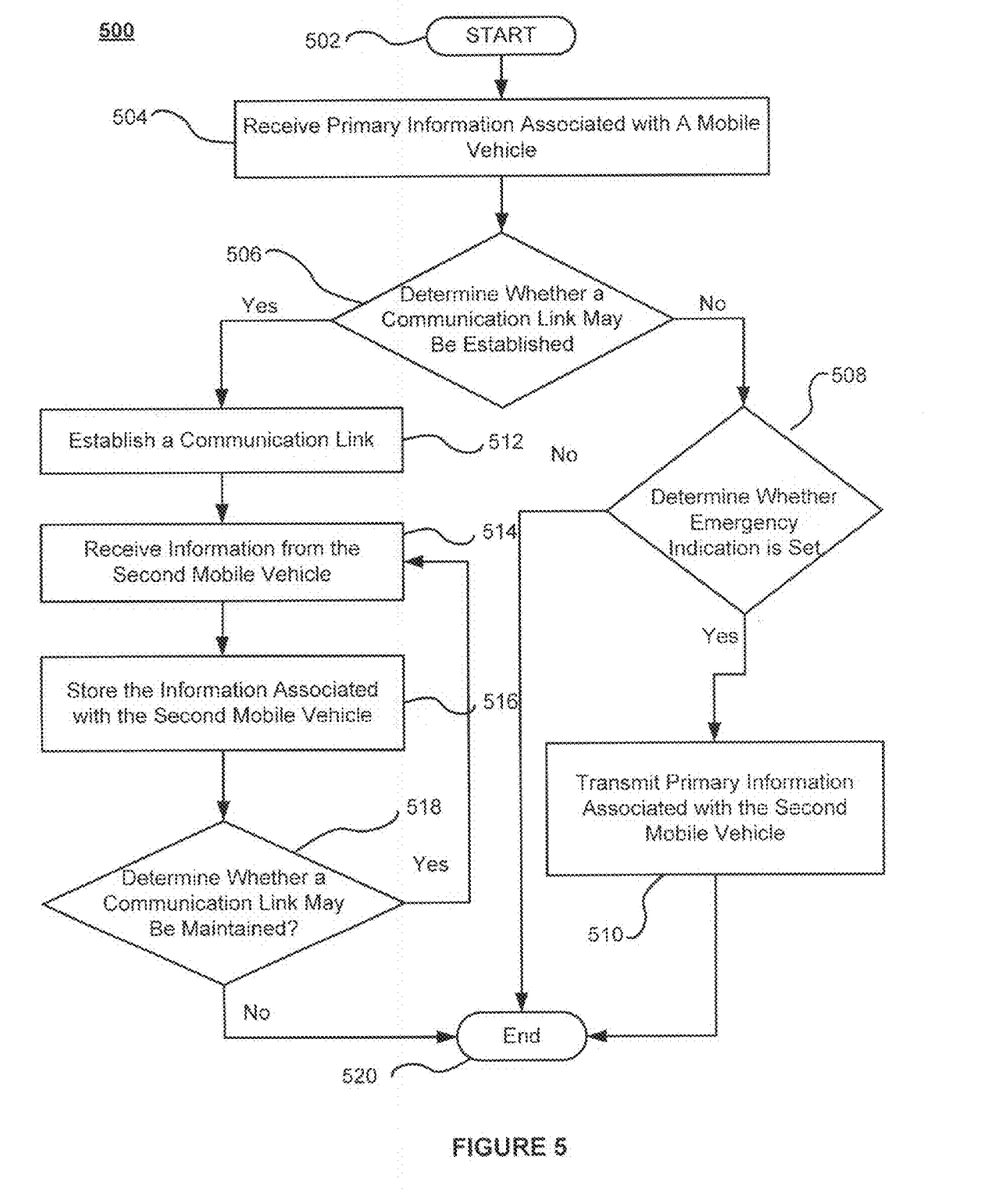
FIG. 5 is a flowchart illustrating the functionality for establishing a communication link between mobile vehicles according to a particular embodiment.

FIG. 5 is a flowchart illustrating the functionality for establishing a communication link between mobile vehicles according to a particular embodiment. This exemplary method 500 may be provided by way of example, as there are a variety of ways to carry out the method. The method 500 shown in FIG. 5 can be executed or otherwise performed by one or a combination of various systems. The method 500 is described below may be carried out by the systems and networks shown in FIGS. 1 and 2, by way of example, and various elements of the systems and networks are referenced in explaining the example method of FIG. 5. Each block shown in FIG. 5 represents one or more processes, methods or subroutines carried out in exemplary method 500. Referring to FIG. 5, exemplary method 500 may begin at block 502.

At block 502, the method 500 for establishing a communication link between mobile vehicles may begin.

At block 504, the communication system 104 may receive primary information associated with a mobile vehicle 102. For example, a first communication system 104a associated with a first mobile vehicle 102a may receive primary information associated with a second mobile vehicle 102b transmitted by a second communication system 104b associated with the second mobile vehicle 102b. For example, the transceiver mobile 208 of the first communication system 104a may receive the primary information associated with the second mobile vehicle 102b. For example, the transceiver module 208 may preprocess the received primary information associated with the second mobile vehicle 102b. In an exemplary embodiment, the transceiver module 208 may receive packets of primary information associated with the second mobile vehicle 102b via the transmission control protocol (TCP) or the Internet protocol (IP). The transceiver module 208 may format the received primary information associated with the second mobile vehicle 102b for later processing. In other exemplary embodiments, the transceiver module 208 may provide the received primary information associated with the second mobile vehicle 102b to other modules of the first communication system 104a. After receiving primary information associated with the second mobile vehicle 102b, the method 500 may proceed to block 506.

At block 506, the first communication system 104a may determine whether a communication link may be established. For example, the processing module 210 may process the received primary information associated with the second mobile vehicle 102b provided by the transceiver module 208. The processing module 210 may extract the received primary information associated with the second mobile vehicle 102b. In an exemplary embodiment, the processing module 210 may extract the primary information to determine the position, velocity, direction, identification or other information associated with the second mobile vehicle 102b. Simultaneously or subsequent to extract the primary information associated with the second mobile vehicle 102b, the processing module 210 may also obtain primary information associated with the first mobile vehicle 102a. For example, the processing module 210 may access the database module 212, the information module 214, or the GPS module 216 to obtain the primary information associated with the first mobile vehicle 102a. The processing module 210 may determine the position, velocity, direction, identification or other information associated with the first mobile vehicle 102a from the primary information associated with the first mobile vehicle 102a.

The processing module 210 may compare and contrast the primary information associated with the first mobile vehicle 102a with the primary information associated with the second mobile vehicle 102b. In an exemplary embodiment, the processing module 210 may compare the position of the first mobile vehicle 102a with the position of the second mobile vehicle 102b. The processing module 210 may determine whether the position of the first mobile vehicle 102a and the position of the second mobile vehicle 102b are within a predetermined transmission range (e.g., 0.25 miles to 0.5 miles).

In another exemplary embodiment, the processing module 210 may compare the velocity of the first mobile vehicle 102a with the velocity of the second mobile vehicle 102b. The processing module 210 may determine whether the velocity of the first mobile vehicle 102a and the velocity of the second mobile vehicle 102b are within a predetermined range (e.g., 5 mph to 10 mph). In an alternative embodiment, the processing module 210 may compare a direction of travel of the first mobile vehicle 102a with the direction of travel of the second mobile vehicle 102b. The processing module 210 may determine whether the direction of travel of the first mobile vehicle 102a and the direction of travel of the second mobile vehicle 102b are within a predetermined range (e.g., 5 degree to 10 degree).

The processing module 210 may determine whether a communication link may be established between the first mobile vehicle 102a and the second mobile vehicle 102b based at least in part on a comparison of the primary information associated with the first mobile vehicle 102a with the primary information associated with the second mobile vehicle 102b. For example, the processing module 210 may determine whether a communication link may be established between the first mobile vehicle 102a and the second mobile vehicle 102b based at least in part on the position, velocity, direction, identification and other information associated with the mobile vehicles 102. In an exemplary embodiment, the processing module 210 may determine that a communication link may be established between the first mobile vehicle 102a and the second mobile vehicle 102b based at least in part on a determination that the position of the first mobile vehicle 102a and the position of the second mobile vehicle 102b are within a predetermined range (e.g., 0.25 miles to 0.5 miles). In another exemplary embodiment, the processing module 210 may determine that a communication link may be established between the first mobile vehicle 102a and the second mobile vehicle 102b based at least in part on a determination that the velocity of the first mobile vehicle 102a and the velocity of the second mobile vehicle 102b are within a predetermined range (e.g., 5 mph to 10 mph). In other exemplary embodiment, the processing module 210 may determine that a communication link may be established between the first mobile vehicle 102a and the second mobile vehicle 102b based at least in part on a determination that the first mobile vehicle 102a and the second mobile vehicle 102b are travelling in a similar direction (e.g., 5 degrees to 10 degrees).

In the event that the processing module 210 determines that a communication link may not be established between the first mobile vehicle 102a and the second mobile vehicle 102b, the method 500 may proceed to block 508. At block, 508, the communication system 104 may determine whether the primary information associated with the second mobile vehicle 102b may include an emergency indication. In an exemplary embodiment, the processing module 210 may process the primary information associated with the second mobile vehicle 102b to determine whether the primary information associated with the second mobile vehicle 102b may include an emergency indication. The emergency indication included in the primary information associated with the second mobile vehicle 102b may indicate an identification of the second mobile vehicle 102b and a priority level of the primary information. In an exemplary embodiment, the emergency indication may identify that the second mobile vehicle 102 is an emergency response vehicle (e.g., ambulance, fire engine, or police). In another exemplary embodiment, the emergency indication may indicate that the primary information associated with the second mobile vehicle 102b may include emergency response messages with the highest priority level (e.g., "E").

In the event that the processing module 210 may determine the primary information associated with the second mobile vehicle 102b may include an emergency indication. The processing module 210 may determine that the second mobile vehicle 102b may be an emergency response vehicle. The processing module 210 may determine the position, velocity, direction, and an identification of the emergency response vehicle based at least in part on the primary information associated with the second mobile vehicle 102b. The processing module 210 may present the position, velocity, direction and an identification of the emergency response vehicle to the user of the first mobile vehicle 102a via the presentation module 206.

In the event that the primary information associated with the second mobile vehicle 102b may include an emergency indication, the method 500 may proceed to block 510. At block 510, the communication system 104 may transmit the primary information associated with the second mobile vehicle 102b. For example, the processing module 210 may provide the primary information associated with the second mobile vehicle 102b including an emergency indication to the database module 214 and stored. The database module 214 may combine the primary information associated with the second mobile vehicle 102b including an emergency indication with the primary information associated with the first mobile vehicle 102a to be transmitted by the transceiver module 208. The processing module 210 may instruct the database module 214 to provide the primary information associated with the second mobile vehicle 102b including an emergency indication with the primary information associated with the first mobile vehicle 102a to the encryption module 218 and the transceiver module 208 to be transmitted to other mobile vehicles 102(b-z). After transmitting the primary information associated with the second mobile vehicle 102b, the method may proceed to block 520. Also, in the event that the primary information associated with the second mobile vehicle 102b do not include an emergency flag, the method 500 may proceed to block 520.

As discussed above, in the event that the processing module 210 determines that a communication link may be established between the first mobile vehicle 102a and the second mobile vehicle 102b, the method 500 may proceed to block 512. At block 512; the first communication system 104a of the first mobile vehicle 102a and the second communication system 104b of the second mobile vehicle 102b may establish a communication link. For example, the transceiver module 208 of the first communication system 104a and the transceiver module 208 of the second communication system 104b may establish a communication link. The transceiver module 208 of the first communication system 104a may transmit and receive information from the transceiver module 208 of the second communication system 104b. After establishing a communication link between the first communication system 104a of the first mobile vehicle 102a and the second communication system 104b of the second mobile vehicle 102b, the method 500 may proceed to block 514.

At block 514, the first communication system 104a may receive information from the second mobile vehicle 102b. In an exemplary embodiment, the transceiver module 208 of the first communication system 104a may receive information from the transceiver module 208 of the second communication system 104b. For example, the transceiver module 208 of the first communication system 104a may receive primary information and secondary information associated with the second mobile vehicle 102b from the transceiver module 208 of the second communication system 104b. In an exemplary embodiment, the transceiver module 208 may continuously or periodically receive updated primary information associated with the second mobile vehicle 102b. In another exemplary embodiment, the transceiver module 208 may continuously or periodically receive secondary information associated with the second mobile vehicle 102b. The secondary information associated with the second mobile vehicle 102b may be telemetry information which may include brake application, emergency vehicle, turn signals, driving reverse, parked, lights on, component malfunctions, and other information associated with the second mobile vehicle 102b.

The secondary information associated with the second mobile vehicle 102b may also include messages provided by the second mobile vehicle 102b. The processing module 210 may process the messages provided by the second mobile vehicle 102b. For example, the processing module 210 may identify a max-hop counter associated with the messages provided by the second mobile vehicle 102b. The max-hop counter may indicate a number of times the messages may be relayed. The processing module 210 may determine whether to relay the messages to other mobile vehicles 102(b-z) based at least in part on the max-hop counter. In an exemplary embodiment, the processing module 210 may examine the max-hop counter that may be transmitted as part of the metadata associated with the messages. The processing module 210 may determine whether the max-hop counter reached zero. In the event that the processing module 210 determines that the max-hop counter equals one, the processing module 210 may decrement the max-hop counter by one and not to relay the message to other mobile vehicles 102. In the event that the processing module 210 determines that the max-hop counter is great than one, the processing module 210 may decrement the max-hop counter by 1 and relay the message to other mobile vehicles 102.

The processing module 210 may generate requests for information. In an exemplary embodiment, a user associated with the first mobile vehicle 102a may input requests for information via the presentation module 206. The presentation module 206 may provide the request to the processing module 210 to be processed and transmitted to the second mobile vehicle 102b via the transceiver module 208. In another exemplary embodiment, the processing module 210 may generate requests for information based at least in part on received information from the second mobile vehicle 102b. For example, the processing module 210 may generate requests for updated information from the second mobile vehicle 102b. The processing module 210 may provide the requests to the encryption module 218 and the transceiver module 208 to be transmitted to the second mobile vehicle 102b. In response to receiving the request provided by the first mobile vehicle 102a, the second mobile vehicle 102b may provide the requested information. In another exemplary embodiment, the first mobile vehicle 102a may provide information to the second mobile vehicle 102b. After receiving information from the second mobile vehicle 102b, the method 500 may proceed to block 516.

At block 516, the communication system 104 may store information associated with the second mobile vehicle 102b. For example, the database module 212 may store the information received from the second mobile vehicle 102b. The database module 212 may store primary information associated with the second mobile vehicle 102b and the secondary information associated with the second mobile vehicle 102b. The database module 212 may compress, store, transfer or discard information associated with the second mobile vehicle 102b and the messages stored within, after a period of time, e.g., a minute, an hour, a day. After storing the information associated with the second mobile vehicle 102b, the method 500 may proceed to block 518.

At block 518, the communication system 104 may determine whether a communication link may be maintained with the second mobile vehicle 102b. For example, after establishing a communication link with the second mobile vehicle 102b, the transceiver module 208 may continuously or periodically receive updated primary information associated with the second mobile vehicle 102b. The transceiver module 208 may provide the updated primary information associated with the second mobile vehicle 102b to the processing module 210. The processing module 210 may extract the updated primary information associated with the second mobile vehicle 102b. For example, the processing module 210 may extract the updated primary information associated with the second mobile vehicle 102b to determine the position, velocity, direction, identification, or other information associated with the second mobile vehicle 102b. Simultaneously or subsequent to extract the updated primary information associated with the second mobile vehicle 102b, the processing module 210 may also obtain updated primary information associated with the first mobile vehicle 102a. For example, the processing module 210 may access the database module 212, the information module 214, or the GPS module 216 to obtain the updated primary information associated with the first mobile vehicle 102a. The processing module 210 may determine the position, velocity, direction, identification, or other information associated with the first mobile vehicle 102a from the primary information associated with the first mobile vehicle 102a.

The processing module 210 may compare and contrast the updated primary information associated with the first mobile vehicle 102a with the updated primary information associated with the second mobile vehicle 102b. In an exemplary embodiment, the processing module 210 may compare the updated position of the first mobile vehicle 102a with the updated position of the second mobile vehicle 102b. The processing module 210 may determine whether the updated position of the first mobile vehicle 102a and the updated position of the second mobile vehicle 102b are within a predetermined transmission range (e.g., 0.25 miles to 0.5 miles). In another exemplary embodiment, the processing module 210 may compare the updated velocity of the first mobile vehicle 102a with the updated velocity of the second mobile vehicle 102b. The processing module 210 may determine whether the updated velocity of the first mobile vehicle 102a and the updated velocity of the second mobile vehicle 102b are within a predetermined range (e.g., 5 mph to 10 mph). In an alternative embodiment, the processing module 210 may compare the updated direction of travel of the first mobile vehicle 102a with the updated direction of travel of the second mobile vehicle 102b. The processing module 210 may determine whether the updated direction of travel of the first mobile vehicle 102a and the updated direction of travel of the second mobile vehicle 102b are within a predetermined range (e.g., 5 degree to 10 degree).

In the event that the processing module 210 may determine that a communication link may be maintained with the second mobile vehicle 102b, the method 500 may proceed back to block 514 and the transceiver module 208 may continue to transmit information to and receive information from the second mobile vehicle 102b. In the event that the processing module 210 may determine that a communication link may not be maintained with the second mobile vehicle 102b, the method 500 may proceed to block 520.

At block 520, the method of establishing a communication link between mobile vehicles may end.

Figure 6:
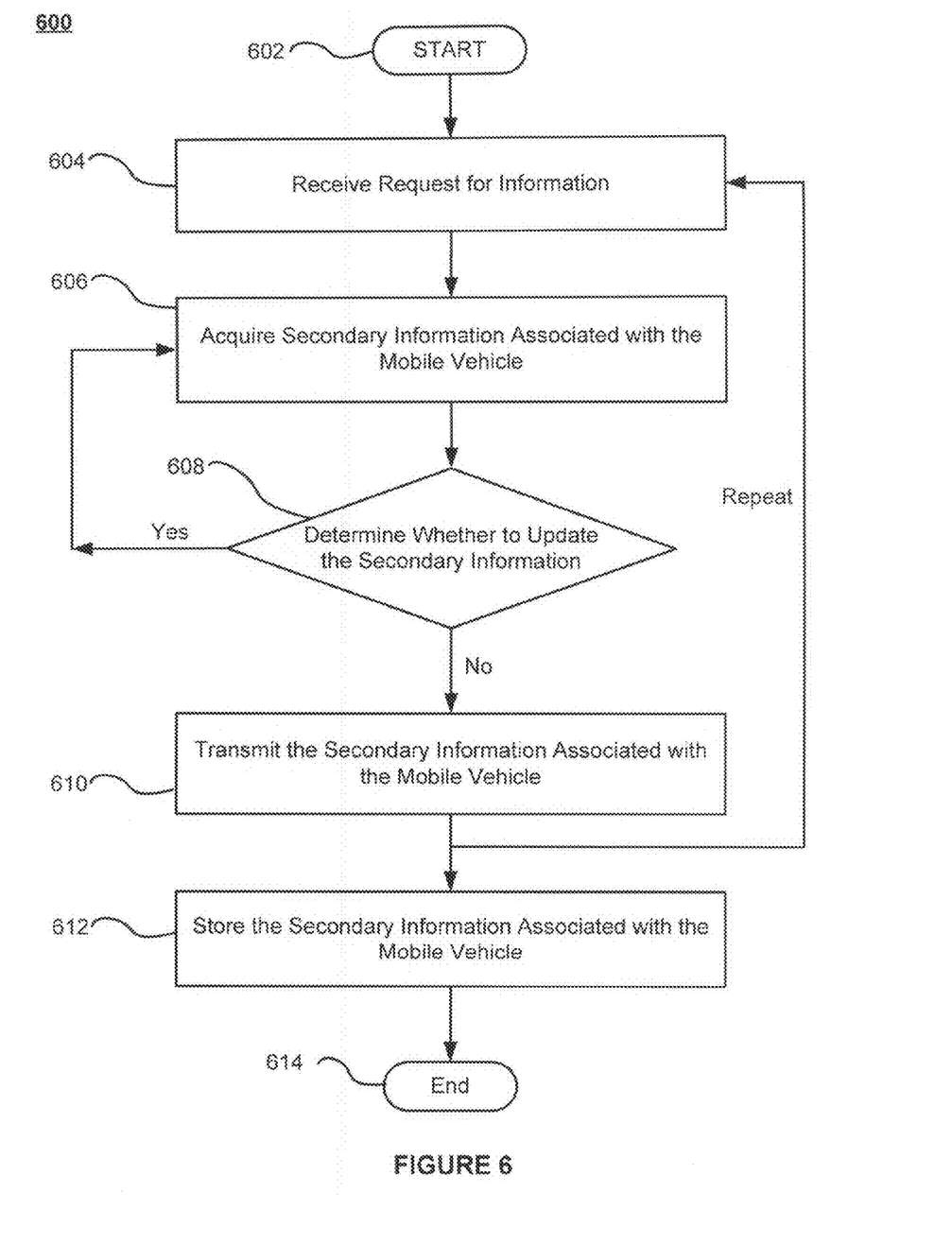
FIG. 6 is a flowchart illustrating the functionality for establishing a communication link between mobile vehicles according to a particular embodiment.

FIG. 6 is a flowchart illustrating the functionality for establishing a communication link between mobile vehicles according to a particular embodiment. This exemplary method 600 may be provided by way of example, as there are a variety of ways to carry out the method. The method 600 shown in FIG. 6 can be executed or otherwise performed by one or a combination of various systems. The method 600 is described below may be carried out by the system and network shown in FIGS. 1 and 2, by way of example, and various elements of the system and network are referenced in explaining the example method of FIG. 6. Each block shown in FIG. 6 represents one or more processes, methods or subroutines carried out in exemplary method 600. Referring to FIG. 6, exemplary method 600 may begin at block 602.

At block 602, the method 600 for establishing a communication link between mobile vehicles 102 may begin.

At block 604, the second communication system 104b may receive request for information. For example, the transceiver module 208 may receive a confirmation that a communication link may be established between the first mobile vehicle 102a and the second mobile vehicle 102b. Information may be transferred between the first mobile vehicle 102a and the second mobile vehicle 102b via the communication link. The first mobile vehicle 102a and the second mobile vehicle 102b may receive request for information from each other. The request for information may include request for primary information associated with the first mobile vehicle 102a and the second mobile vehicle 102b and secondary information associated with the first mobile vehicle 102a and the second mobile vehicle 102b. The transceiver module 208 may receive the request for information and provide the request for information to the processing module 210, the database module 212, the information module 214, or the GPS module 216. After receiving request for information, the method 600 may proceed to block 606.

At block 606, the communication system 104 may acquire secondary information associated with the mobile vehicle 102. For example, the processing module 210 may provide executable commands to other modules of the communication system 104 to acquire primary information and secondary information associated with the mobile vehicle 102. In an exemplary embodiment, the processing module 210 may provide an acquire executable command to the information module 214 to acquire secondary information associated with the mobile vehicle 102. In another exemplary embodiment, the processing module 210 may provide an acquire command to the database module 212 to acquire secondary information associated with the mobile vehicle 102. For example, the secondary information associated with the mobile vehicle 102 may be telemetry information which may include brake application, emergency vehicle, turn signals, driving reverse, parked, lights on, component malfunctions, and other information associated with the mobile vehicle 102. In an alternative exemplary embodiment, the information module 214 may automatically acquire secondary information associated with the mobile vehicle 102. The information module 214 may provide the secondary information associated with the mobile vehicle 102 to the database module 212 and stored. The information module 214 or the database module 212 may provide the secondary information associated with the mobile vehicle 102 to the processing module 210. After acquiring secondary information associated with the mobile vehicle 102, the method 600 may proceed to block 608.

At block 608, the communication system 104 may determine whether to update the secondary information associated with the mobile vehicle 102. For example, the processing module 210 may process the secondary information associated with the mobile vehicle 102 to determine whether to update the secondary information associated with the mobile vehicle 102. In an exemplary embodiment, the processing module 210 may determine a time stamp of the acquisition of the secondary information associated with the mobile vehicle 102. The processing module 210 may determine to update the secondary information associated with the mobile vehicle 102 when a predetermined amount of time has lapsed from the time stamp of the acquisition of the secondary information associated with the mobile vehicle 102. The processing module 210 may determine not to update the secondary information associated with the mobile vehicle 102 when a predetermined amount of time has not lapsed from the time of the acquisition of the secondary information associated with the mobile vehicle 102. For example, the processing module 210 may determine the predetermined amount of time to be 3 seconds.

In another exemplary embodiment, the processing module 210 may access the database module 212 or the information module 214 to determine whether new secondary information are available. For example, the processing module 210 may periodically access the database module 212 or the information module 214 to check whether new secondary information are acquired. In other exemplary embodiments, the processing module 210 may instruct the information module 214 to acquire secondary information associated with the mobile vehicle 102. The processing module 210 may compare the newly acquired secondary information with previously acquired secondary information to determine whether to update the secondary information associated with the mobile vehicle 102. In the event that the processing module 210 determines that the secondary information need to be updated, the method 600 may return to block 606. In the event that the processing module 210 determines that the secondary information do not need to be updated, the method 600 may proceed to block 610.

At block 610, the communication system 104 may transmit the secondary information associated with the mobile vehicle 102. In an exemplary embodiment, the processing module 210 may provide the secondary information associated with the mobile vehicle 102 to the transceiver module 208 to be transmitted. In another exemplary embodiment, the information module 214 may directly provide the secondary information associated with the mobile vehicle 102 to the transceiver module 208 to be transmitted. In other exemplary embodiment, the secondary information associated with the mobile vehicle 102 may be encrypted by the encryption module 218 before being transmitted by the transceiver module 208. The presentation module 206 may provide confirmation to the user of the mobile vehicle 102 that the secondary information associated with the mobile vehicle 102 may be transmitted. In an exemplary embodiment, after transmitting the secondary information associated with the mobile vehicle 102, the method 600 may return to block 604 and repeat the method of establishing a communication link between mobile vehicles. In another exemplary embodiment, after transmitting the secondary information associated with the mobile vehicle 102, the method 600 may proceed to block 612.

At block 612, the communication system 104 may store the secondary information associated with the mobile vehicle 102. In an exemplary embodiment, the secondary information associated with the mobile vehicle 102 may be stored in the database module 212. For example, the secondary information associated with the mobile vehicle 102 may be stored in the database module 212 after transmission of the secondary information associated with the mobile vehicle 102. In another exemplary embodiment, the secondary information associated with the mobile vehicle 102 may be stored in the mobile vehicle 102 for a predetermined period of time. After storing the secondary information associated with the mobile vehicle 102, the method 600 may proceed to block 614.

At block 614, the method 600 may end.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method, comprising:
    acquiring, via an information module or a GPS module at a first mobile vehicle, first information associated with the first mobile vehicle, wherein the first information comprises one or more messages having a max-hop counter that is decremented each time the first information is relayed;
    determining, via a processing module at the first mobile vehicle, whether to update the first information associated with the first mobile vehicle; and
    transmitting, via a transceiver module at the first mobile vehicle, the first information associated with the first mobile vehicle based at least in part on the determination of not to update the first information associated with the first mobile vehicle, wherein the transceiver module does not transmit the first information if the processing module determines that the first information should be updated.

2. The method of claim 1, wherein the first information associated with the first mobile vehicle comprise at least one of a position of the first mobile vehicle, a velocity of the first mobile vehicle, a direction of the first mobile vehicle, and an identification of the first mobile vehicle.

3. The method of claim 1, further comprising acquiring updated first information associated with the first mobile vehicle based at least in part on the determination of updating the first information associated with the mobile vehicle.

4. The method of claim 1, wherein transmitting the first information associated with the first mobile vehicle is via at least one of a transmission control protocol (TCP) or an Internet protocol (IP).

5. The method of claim 1, further comprising assigning a priority level associated with the first information associated with the first mobile vehicle.

6. The method of claim 5, wherein assigning a priority level associated with the first information associated with the first mobile vehicle is based at least in part on an identification of the first mobile vehicle.

7. The method of claim 1, further comprising storing the first information associated with the first mobile vehicle.

8. The method of claim 1, wherein transmitting the first information associated with the first mobile vehicle is further based at least in part on a current value of the max-hop counter.

9. A method comprising:
    receiving, via a transceiver module at a second mobile vehicle, first information associated with a first mobile vehicle, wherein the first information comprises one or more messages having a max-hop counter that is decremented each time the first information is relayed;
    determining, via a processing module at the second mobile vehicle, whether a communication link can be established with the first mobile vehicle based at least in part on the first information associated with the first mobile vehicle;
    establishing, via the transceiver module at the second mobile vehicle, the communication link to receive second information associated with the first mobile vehicle based at least in part on the determination that the communication link can be established with the first mobile vehicle; and
    determining a priority level of the first information associated with the first mobile vehicle based at least in part on the determination that the communication link cannot be established with the first mobile vehicle.

10. The method of claim 9, wherein the first information associated with the first mobile vehicle comprise at least one of a position of the first mobile vehicle, a velocity of the first mobile vehicle, a direction of the first mobile vehicle, and an identification of the first mobile vehicle.

11. The method of claim 9, further comprising transmitting the first information associated with the first mobile vehicle based at least in part on the determination that the first information associated with the first mobile vehicle include an emergency flag.

12. The method of claim 11, further comprising adding the first information associated with the first mobile vehicle to first information associated with the second mobile vehicle.

13. The method of claim 9, further comprising discarding the first information associated with the first mobile vehicle based at least in part on the determination that the first information associated with the first mobile vehicle does not include an emergency flag.

14. The method of claim 9, further comprising determining whether the communication link can be maintained.

15. The method of claim 14, wherein determining whether the communication link can be maintained comprises comparing updated first information associated with the first mobile vehicle with first information associated with the second mobile vehicle.

16. The method of claim 9, wherein the second information associated with the first mobile vehicle comprise at least one of brake application, an emergency vehicle, turn signals, driving reverse, parked, lights on, and component malfunctions.

17. A method, comprising:
    receiving, via a transceiver module, a request for second information associated with a first mobile vehicle based at least in part on a transmission of first information associated with the first mobile vehicle;
    acquiring, via an information module, the second information associated with the first mobile vehicle, wherein the second information comprises one or more messages having a max-hop counter that is decremented each time the second information is relayed;
    determining, via a processing module, whether to update the second information associated with the first mobile vehicle; and
    transmitting, via the transceiver module, the second information associated with the first mobile vehicle based at least in part on the determination of not to update the second information associated with the first mobile vehicle, wherein the transceiver module does not transmit the second information if the processing module determines that the second information should be updated.

18. The method of claim 17, wherein transmitting the second information associated with the first mobile vehicle is further based at least in part on a current value of the max-hop counter.

19. A system, comprising:
- a GPS module configured to acquire first information associated with a first mobile vehicle, wherein the first information comprises one or more messages having a max-hop counter that is decremented each time the first information is relayed;
- a processing module configured to determine whether to update the first information associated with the first mobile vehicle; and
- a transceiver module configured to transmit the first information associated with the first mobile vehicle based at least in part on the determination of not to update the first information associated with the first mobile vehicle, wherein the transceiver module does not transmit the first information if the processing module determines that the first information should be updated.

20. The system of claim 19, further comprising a database module configured to store the first information associated with the first mobile vehicle.

21. The system of claim 19, further comprising an information module configured to acquire second information associated with the first mobile vehicle.

22. The system of claim 19, further comprising a presentation module configured to display messages to users associated with the first mobile vehicle.

23. The system of claim 19, further comprising an encryption module configured to encrypt the first information association with the first mobile vehicle.

24. The system of claim 19, wherein the transceiver module is further configured to transmit the first information associated with the first mobile vehicle based at least in part on a current value of the max-hop counter associated with the one or more messages.

* * * * *